United States Patent
Kodimer et al.

(10) Patent No.: US 8,928,699 B2
(45) Date of Patent: Jan. 6, 2015

(54) USER INTERFACE FOR PAGE VIEW ZOOMING

(75) Inventors: Marianne Kodimer, Huntington Beach, CA (US); Hung Tran, Mission Viejo, CA (US); William Su, Riverside, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/461,623

(22) Filed: May 1, 2012

(65) Prior Publication Data
US 2013/0293572 A1    Nov. 7, 2013

(51) Int. Cl.
G09G 5/00    (2006.01)

(52) U.S. Cl.
USPC ............ 345/661; 345/660; 345/173; 345/174

(58) Field of Classification Search
CPC ... G06F 3/044; G06F 3/0488; G06F 3/04883; G06F 3/045; G06F 3/0412; G06F 3/0481; G06F 3/04845; G09G 2340/0407; G09G 2340/0414; G09G 5/391; G09G 5/14; G06T 3/40; G06T 3/4007; G06T 3/4023
USPC ......... 345/619, 418, 660, 665–669, 173, 174, 345/661; 715/800; 382/298
See application file for complete search history.

(56) References Cited

U.S. PATENT DOCUMENTS

| | | | | |
|---|---|---|---|---|
| 4,790,028 | A * | 12/1988 | Ramage | 345/173 |
| 6,760,041 | B2 * | 7/2004 | Komata | 345/660 |
| 2009/0284478 | A1 * | 11/2009 | De la Torre Baltierra et al. | 345/173 |
| 2010/0053111 | A1 * | 3/2010 | Karlsson | 345/174 |
| 2010/0315438 | A1 * | 12/2010 | Horodezky et al. | 345/661 |
| 2011/0043538 | A1 * | 2/2011 | Ericson et al. | 345/660 |
| 2012/0044267 | A1 * | 2/2012 | Fino | 345/667 |
| 2012/0147052 | A1 * | 6/2012 | Homma et al. | 345/660 |
| 2013/0019200 | A1 * | 1/2013 | Montague | 715/800 |
| 2013/0222318 | A1 * | 8/2013 | Gotman et al. | 345/173 |
| 2013/0265267 | A1 * | 10/2013 | Victor | 345/173 |
| 2013/0293588 | A1 * | 11/2013 | Yu | 345/660 |

FOREIGN PATENT DOCUMENTS

WO    WO 2012092840 A1 *    7/2012

* cited by examiner

*Primary Examiner* — Chante Harrison
(74) *Attorney, Agent, or Firm* — SoCal IP Law Group LLP; Steven C. Sereboff; Jonathan Pearce

(57) ABSTRACT

There is disclosed a method and apparatus for a user interface for page view zooming. The method comprises generating a default user interface including an electronic document. The method further includes receiving touchdown and hold data indicating that a user has interacted with a portion of the electronic document and beginning a continuous zoom process for that portion of the electronic document. The method further includes halting the zoom process once a user has released the touch over the portion of the electronic document and displaying the magnified document on the user interface. The method employs a similar operation to enable a de-zooming operation.

18 Claims, 13 Drawing Sheets

© Kabushiki Kaisha Toshiba & Toshiba Tec Kabushiki Kaisha

© Kabushiki Kaisha Toshiba &
Toshiba Tec Kabushiki Kaisha

© Kabushiki Kaisha Toshiba &
Toshiba Tec Kabushiki Kaisha

USER INTERFACE FOR PAGE VIEW ZOOMING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a user interface for page view zooming.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as a document, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

User interfaces are used in every user-to-computer interaction. One type of user interaction is used to zoom or magnify electronic documents displayed on a user interface. On computers, the process of zooming in on a document typically involves clicking on a "zoom in" button while zooming out typically involves clicking on a "zoom out" button. Similar methodologies are employed in most touchscreen devices. Alternatively, scrollwheels on mice either alone or in conjunction with modifying function keys have been used to zoom in and zoom out of documents in some interfaces. Modern multi-touch devices, as the Apple® iPhone® and many other mobile and desktop devices, may use a plurality of user-touches combined with gestures, such as a "pinch," using two fingers touching a screen that are moved closer together, to zoom out and a "reverse pinch," using two fingers touching a screen that spread further apart, to zoom in.

These interactions are more difficult in non-capacitive touchscreen and non-mouse-based user interfaces. The user typically must recognize icons associated with zooming in and zooming out on an interface. Furthermore, user interface space must be taken up on these typically small displays for these icons. Non-capacitive touchscreens typically cannot register multiple simultaneous screen touches. As a result, multi-touch gestures are impossible.

Throughout this description, elements appearing in figures are assigned three-digit reference designators, where the most significant digit is the figure number and the two least significant digits are specific to the element.

DETAILED DESCRIPTION

Description of Apparatus

Figure 1:
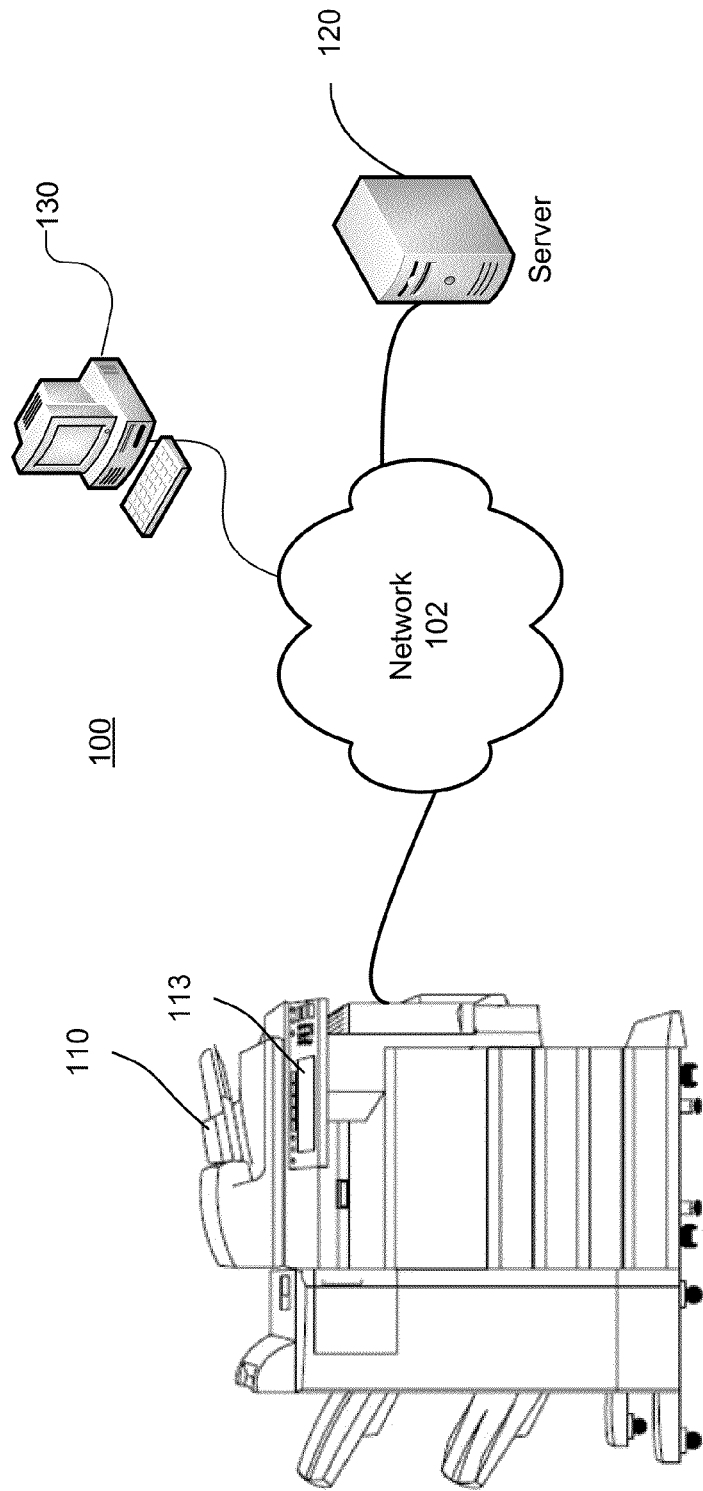
FIG. 1 is a diagram of an MFP system.

Referring now to FIG. 1 there is shown an MFP system 100. The system 100 includes an MFP 110, a server 120, and a client computer 130, all interconnected by a network 102. The system 100 may be implemented in a distributed computing environment and interconnected by the network 102.

The network 102 may be a local area network, a wide area network, a personal area network, the Internet, an intranet, or any combination of these. The network 102 may have physical layers and transport layers according to IEEE 802.11, Ethernet or other wireless or wire-based communication standards and protocols such as WiMax®, Bluetooth®, the public switched telephone network, a proprietary communications network, infrared, and optical.

The MFP 110 may be equipped to receive portable storage media such as USB drives. The MFP 110 includes a user interface subsystem 113 which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The server 120 is a server computer running software and connected to the network. The client computer 130 may be a PC, thin client or other device. The client computer 130 is representative of one or more end-user devices.

Figure 2:
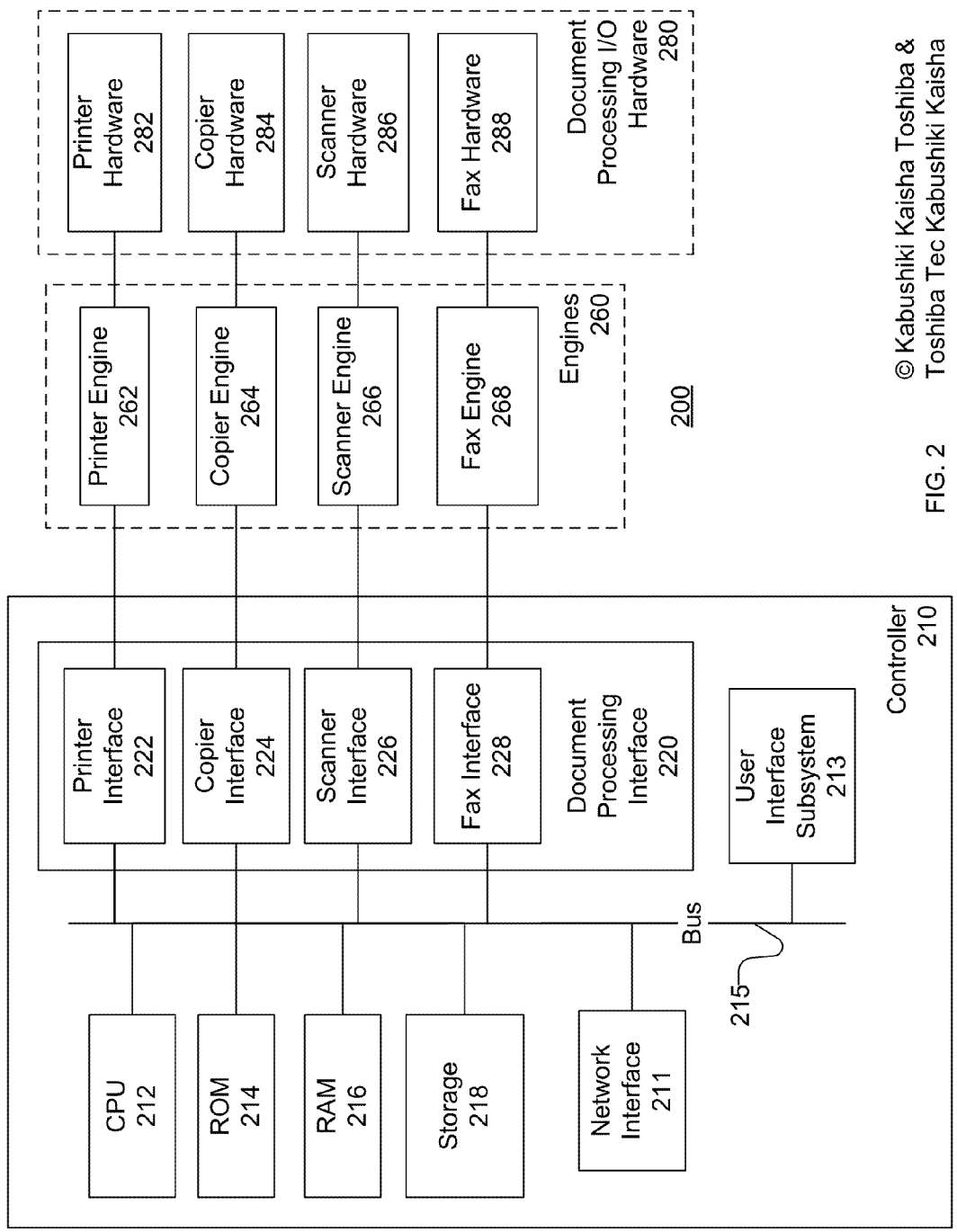
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state storage. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 allowing the MFP 200 to communicate with other devices.

The bus 215 enables data communication between devices and systems within the MFP 200. The bus 215 may conform to the, PCI, PCI Express, or another bus standard.

The MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may include software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions. These engines may include software, firmware, hardware or a combination thereof that enable the document processing interface 220 to communicate with the document processing I/O hardware 280.

Figure 3:
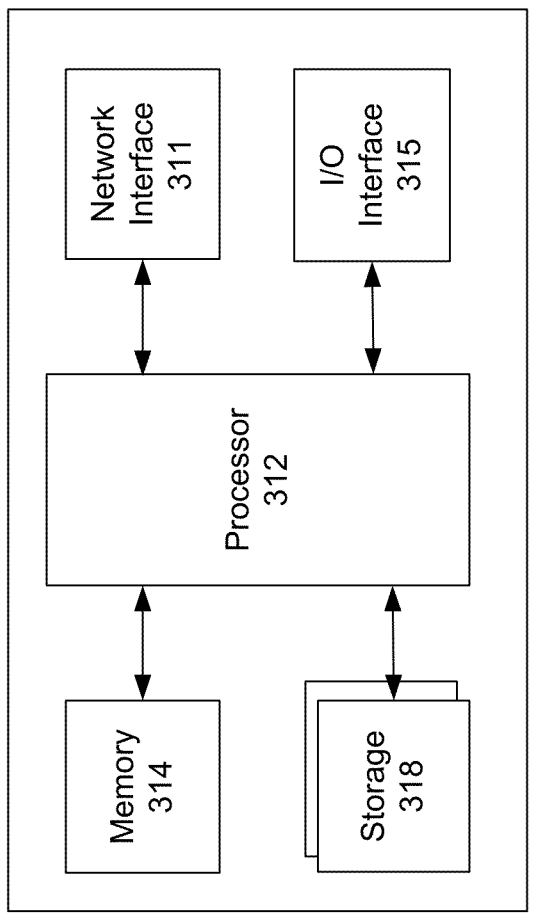
FIG. 3 is a block diagram of a computing device.

Turning now to FIG. 3 there is shown a computing device 300, which is representative of the server computers, client computers and other computing devices discussed herein. The controller 210 may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

As used herein, the term storage medium corresponds to the storage 318 and does not include transitory media such as signals or waveforms.

The network interface 311 includes an interface to a network such as network 102.

The I/O interface 315 interfaces the processor 312 to peripherals (not shown) such as displays, keyboards and USB devices.

Figure 4:
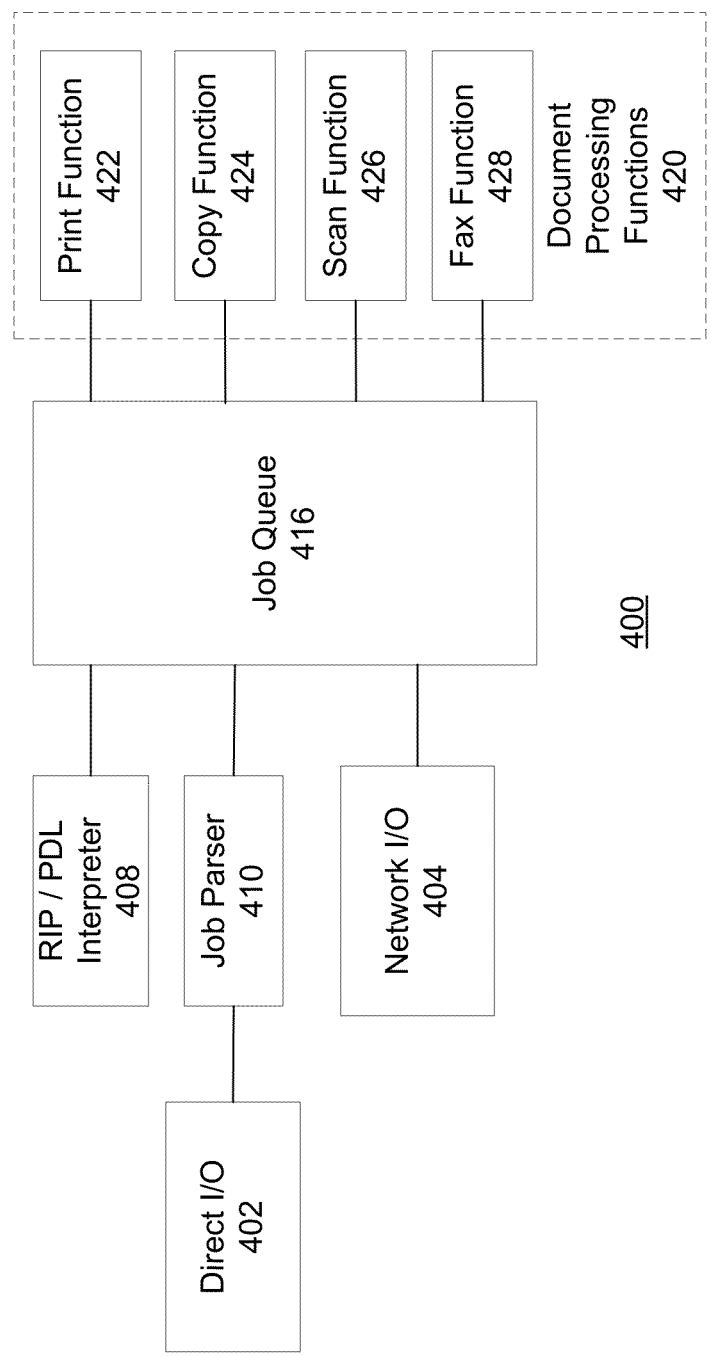
FIG. 4 is a block diagram of a software system for an MFP.

Turning now to FIG. 4 there is shown a block diagram of a software system 400 of an MFP which may operate on the controller 210 (FIG. 2.). The system 400 includes direct I/O 402, network I/O 404, a RIP/PDL interpreter 408, a job parser 410, a job queue 416, a series of document processing functions 420 including a print function 422, a copy function 424, a scan function 426 and a fax function 428.

The direct I/O 402 and the network I/O 404 provide input and output to the MFP controller. The direct I/O 402 is for the user interface on the MFP (e.g., user interface subsystem 113), and the network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail, TELNET, or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the direct I/O 402. The direct I/O 402 may include printing, fax transmission or other input of a document for handling by the system 400.

The print function 422 enables the MFP to print documents and implements each of the various functions related to that process using the printer interface 222. These include stapling, collating, hole punching, and similar functions. The copy function 424 enables the MFP to perform copy operations and all related functions such as multiple copies, collating, 2 to 1 page copying or 1 to 2 page copying and similar functions using the copier interface 224. Similarly, the scan function 426 enables the MFP to scan and to perform all related functions such as shrinking scanned documents, storing the documents on a network or emailing those documents to an email address using the scanner interface 226. The fax function 428 enables the MFP to perform facsimile operations and all related functions such as multiple number fax or auto-redial or network-enabled facsimile using the fax interface 228.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
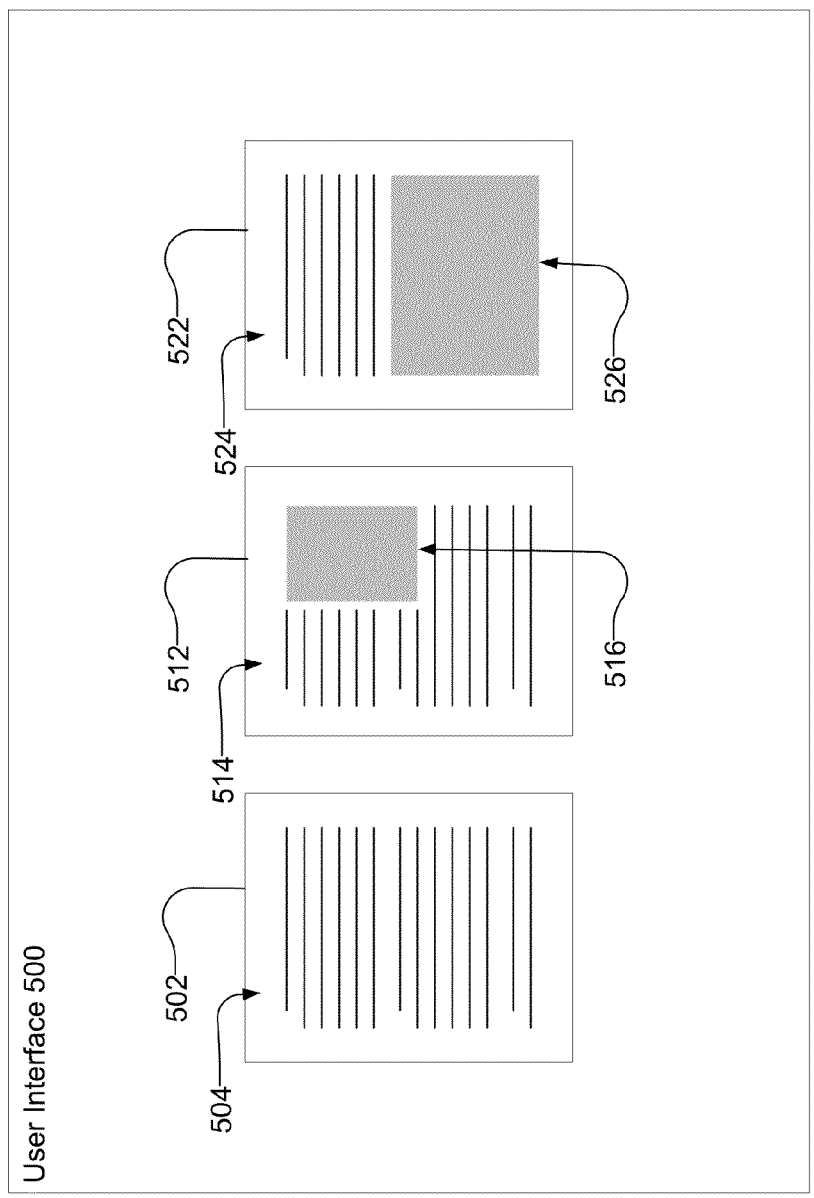
FIG. 5 is a user interface for page view zooming.

Turning now to FIG. 5, a user interface 500 for page view zooming is shown. This may be displayed on the user interface 113 by the user interface subsystem 213 as directed by the controller 210. A series of pages 502, 512 and 522 of an electronic document are shown. These pages 502, 512 and 522 have elements including text 504, text 514 and text 524 and images 516 and 526.

As used herein the term "page" refers to a visual representation of a single image displayed on an MFP. The single image includes text and/or images. An electronic document may be made up of one or more of these pages. A page may be a part of a multi-page electronic document such as a Microsoft® Word® document, a Microsoft® Excel® document, a Microsoft® PowerPoint® presentation, a web page, or any other type of HTML, extensible markup language, text or rich text document. Alternatively, a page may be a digital image such as a JPG, bitmap, TIFF or PDF image.

As used herein the term "zoom" means increasing the magnification level of all or a portion of a page. The term "de-zoom" means to perform the opposite operation to decrease the magnification level of all or a portion of a page. Both the zoom and de-zoom operation are centered on a hold location for a user interface touch on a touchscreen display.

Figure 6:
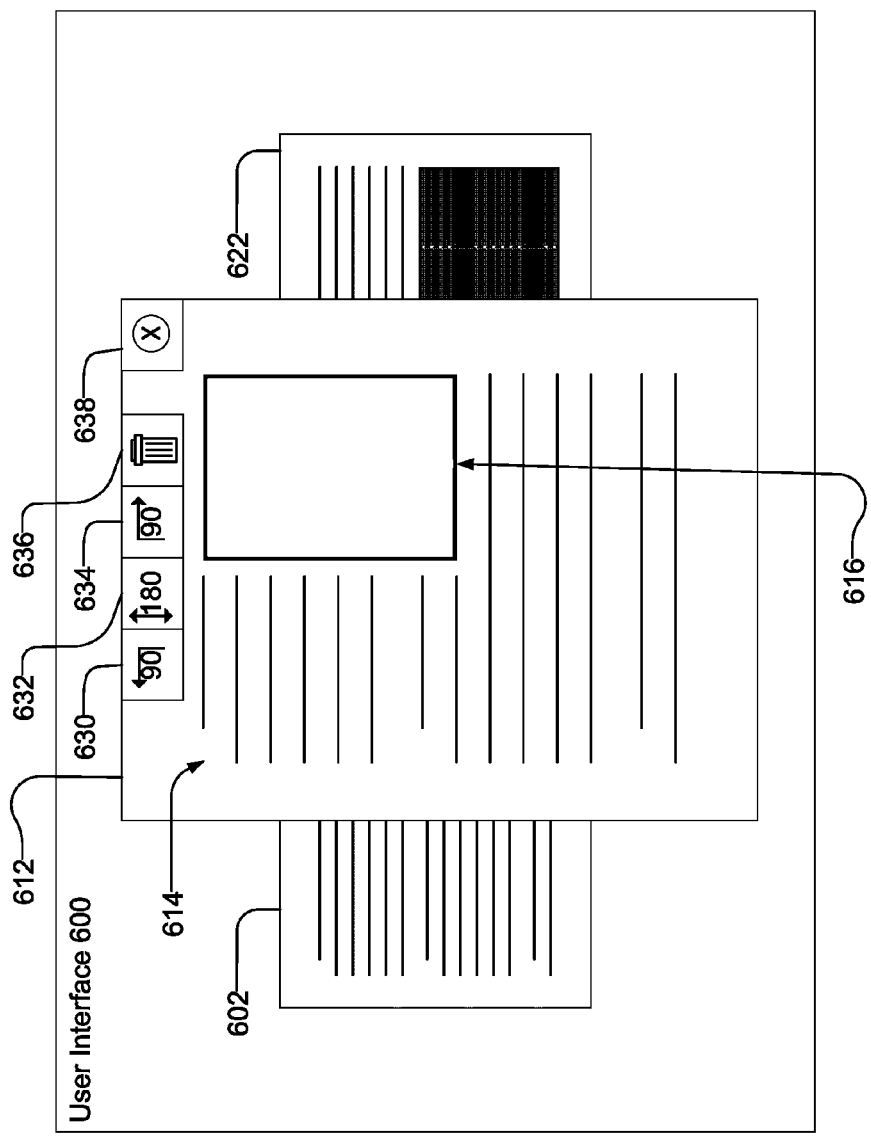
FIG. 6 is a user interface for page view zooming showing a selected page.

Turning now to FIG. 6, a user interface 600 for page view zooming showing a selected page 612 is shown. Here, the same pages 602, 612 and 622 from FIG. 5 (pages 502, 512 and 522) are shown. However, page 612 has been selected. As a result page 612 has increased in size and appears to be "in front" of pages 602 and 622.

Selection of page 612 may be accomplished by a user touching a touch screen associated with the user interface 600 over page 612. The selection causes a plurality of interactive elements to appear over page 612. These elements include a rotate 90° left interface element 630, a rotate 180° interface element 632, a rotate 90° right interface element 634, a delete interface element 636 and a cancel interface element 638. The rotate 90° left interface element 630 causes the selected page 612 to rotate, on the user interface, 90° to the left. The rotate 180° interface element 632 cases the page 612 to rotate, on the user interface 180°. The rotate 90° right interface element 634 causes the selected page 612 to rotate, on the user interface, 90° to the right. The delete interface element 636 removes the selected page 612 from the document. The cancel interface element 638 causes the page 612 to be de-selected and to return to a default position.

Figure 7:
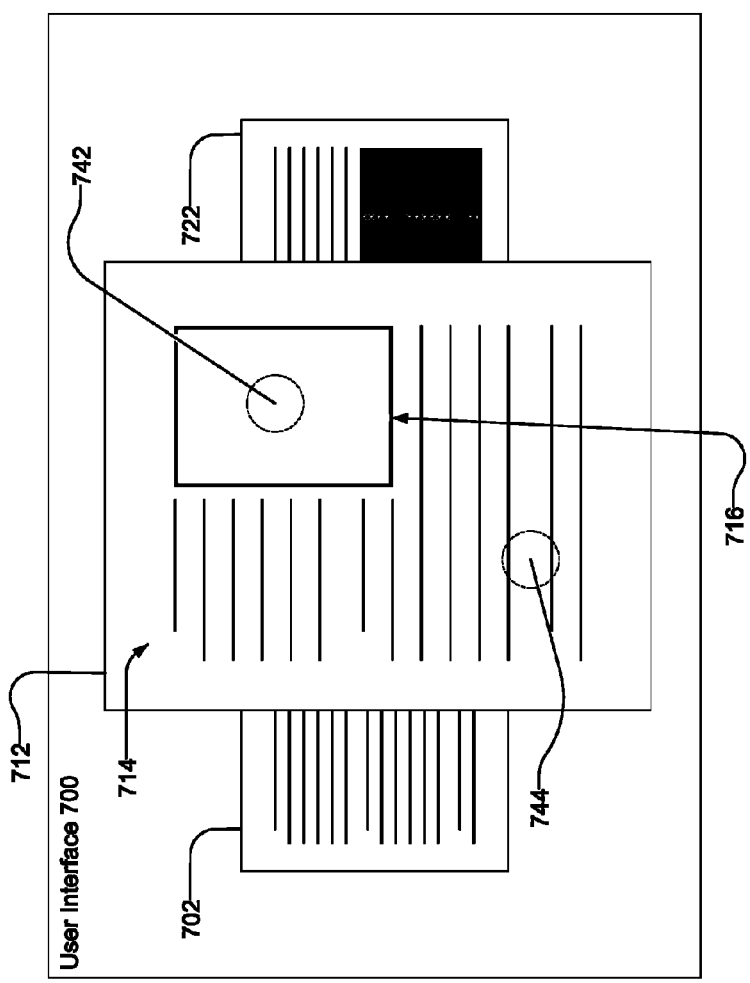
FIG. 7 is a user interface for page view zooming showing a first and second touch and hold locations.

FIG. 7 shows a user interface 700 for page view zooming showing a first and second touch and hold locations. The same pages 702, 712 and 722 are shown with page 712 selected. Page 712 includes text 714 and image 716. Two touches 742 and 744 are shown on page 712. These touches 742 and 744 may be perceived and output as touch data by a touchscreen that is a part of or in communication with the user interface subsystem 213. The touch data may indicate that a touch has been received and the location of that touch on the touchscreen. The touch data may be passed to the controller 210 for processing. The touchscreen may similarly perceive that a touch has been maintained for a period of time, and thereby generate hold data indicating that the touch has been held and a length of time for which that touch has been held.

Figure 8:
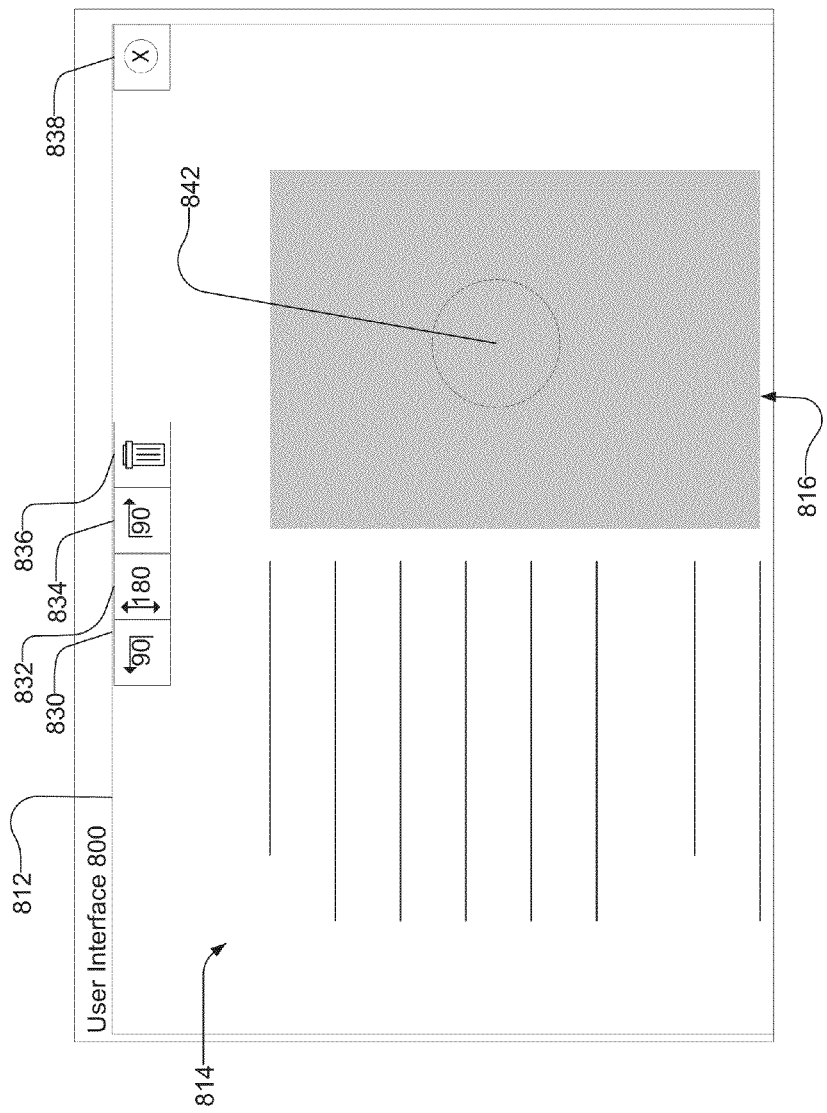
FIG. 8 is a user interface for page view zooming showing a zoom of a first touch and hold location.

FIG. 8 shows a user interface 800 for page view zooming showing a zoom of a first touch and hold location. Page 812 (page 512 in FIG. 5) is now magnified in response to the touch 842 (shown as 742 in FIG. 7) and a user's hold of that touch 842 until the desired magnification level is reached and the user releases that touch 842. This touch and hold is perceived by the touchscreen and touch data and hold data are generated for use by the user interface subsystem 213 and the controller 210.

The touch data includes a location of the touch. As a result, the magnification is increased with the center of that magnification being over the touch 842. When the touch is offcenter, the touch 842 may be compensated such that more of the page is displayed at lower magnification levels, rather than forcing the touch 842 to be the exact center of the magnification. Instead, the edge of the page 812 is determined and as magnification increases, the edge is only moved out of the user interface 800 when the magnification level causes the page 812 to reach the edge of the user interface 800. As a result, the page 812 is not exactly centered over the touch 842, but at the magnification level shown in FIG. 8, the edge of the page 812 has not yet reached the edge of the user interface 800.

Once the touch 842 has been removed, the interactive elements may appear again over page 812. The rotate 90° left interface element 830, a rotate 180° interface element 832, a rotate 90° right interface element 834, a delete interface element 836 and a cancel interface element 838 appear over the now-zoomed page 812. After the magnification level is increased in response to the touch and hold data, the visible portion of text 814 and image 816 appear much larger than before the zoom operation. A portion of page 812 is obscured out of the viewable area of the user interface. A user may, touch and drag the image around the screen in order to view portions of the page 812 not visible at this magnification level and position.

Figure 9:
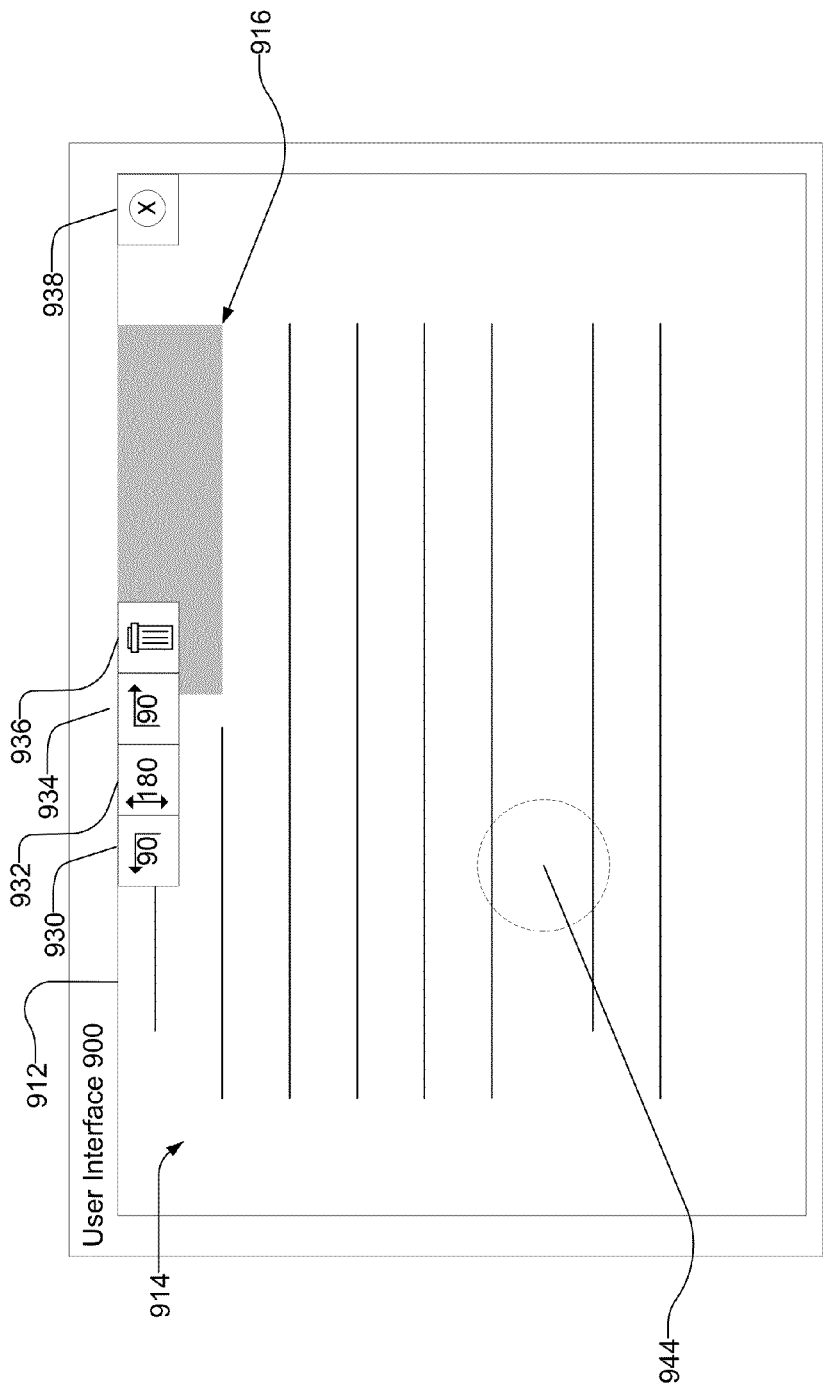
FIG. 9 is a user interface for page view zooming showing a zoom of a second touch and hold location.

FIG. 9 shows a user interface 900 for page view zooming showing a zoom of a second touch and hold location. User interface 900 is similar to user interface 800, but the touch 944 (touch 744 from FIG. 7) is the touch that has been held. As a result, the bottom, left of page 912 has an increased magnification level. The text 914 and image 916 are visible. The top of page 912 is not visible, because of the magnification level and the location of the touch 944 that was held. The touch 944 has been removed and, as a result, the interactive elements have appeared. These include same rotate 90° left interface element 930, a rotate 180° interface element 932, a rotate 90° right interface element 934, a delete interface element 936 and a cancel interface element 938.

Figure 10:
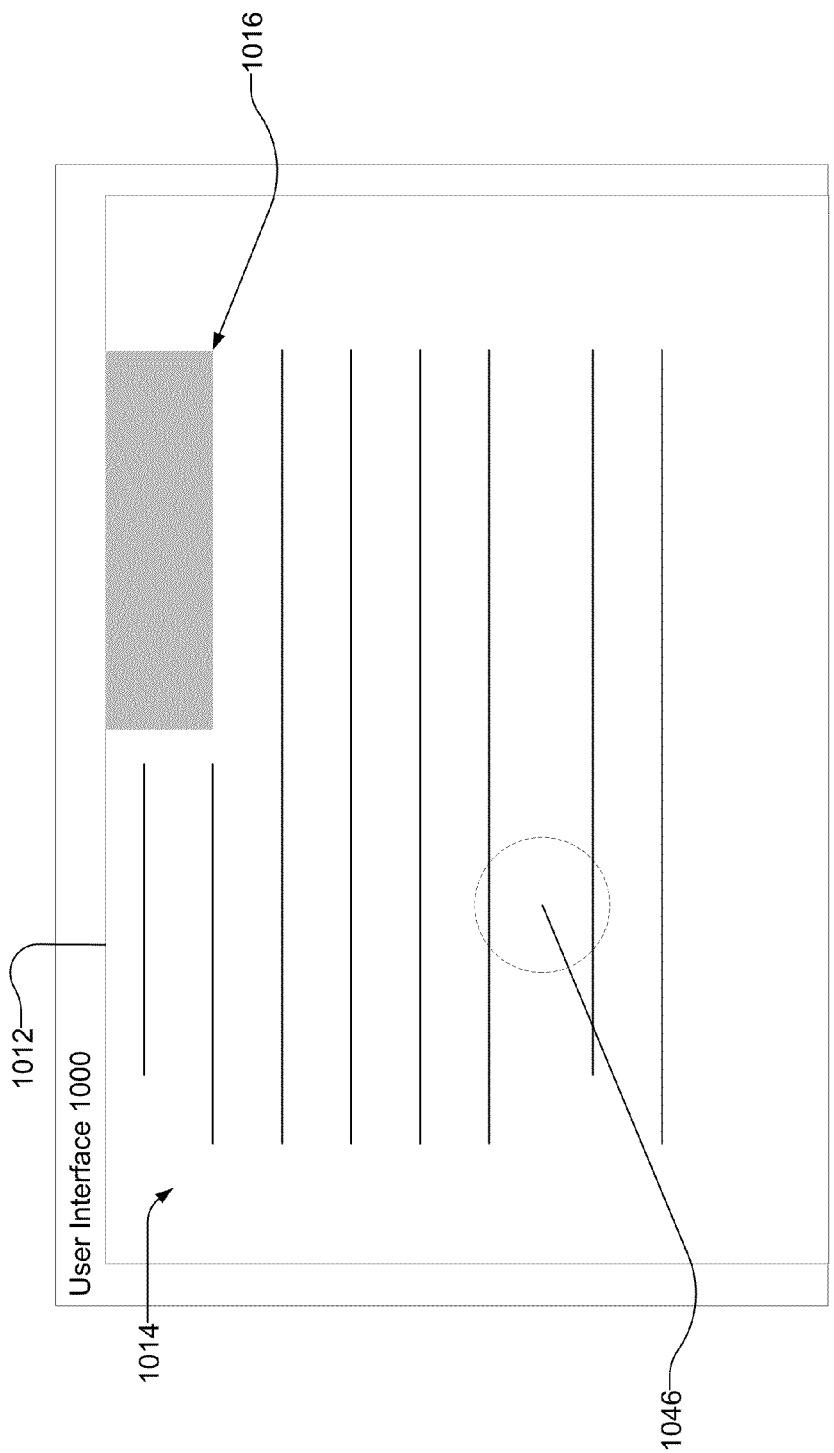
FIG. 10 is a user interface for page view de-zooming showing a double-touch and hold location.

FIG. 10 shows a user interface 1000 for page view de-zooming showing a double-touch and hold location. The page 1012 is the same page 912 including text 1014 and image 1016. The user has double-touched and held the page 1012 at touch 1046 meaning that the user has tapped the touchscreen display twice in rapid succession and held the second tap. As a result, the de-zoom process is initiated.

Figure 11:
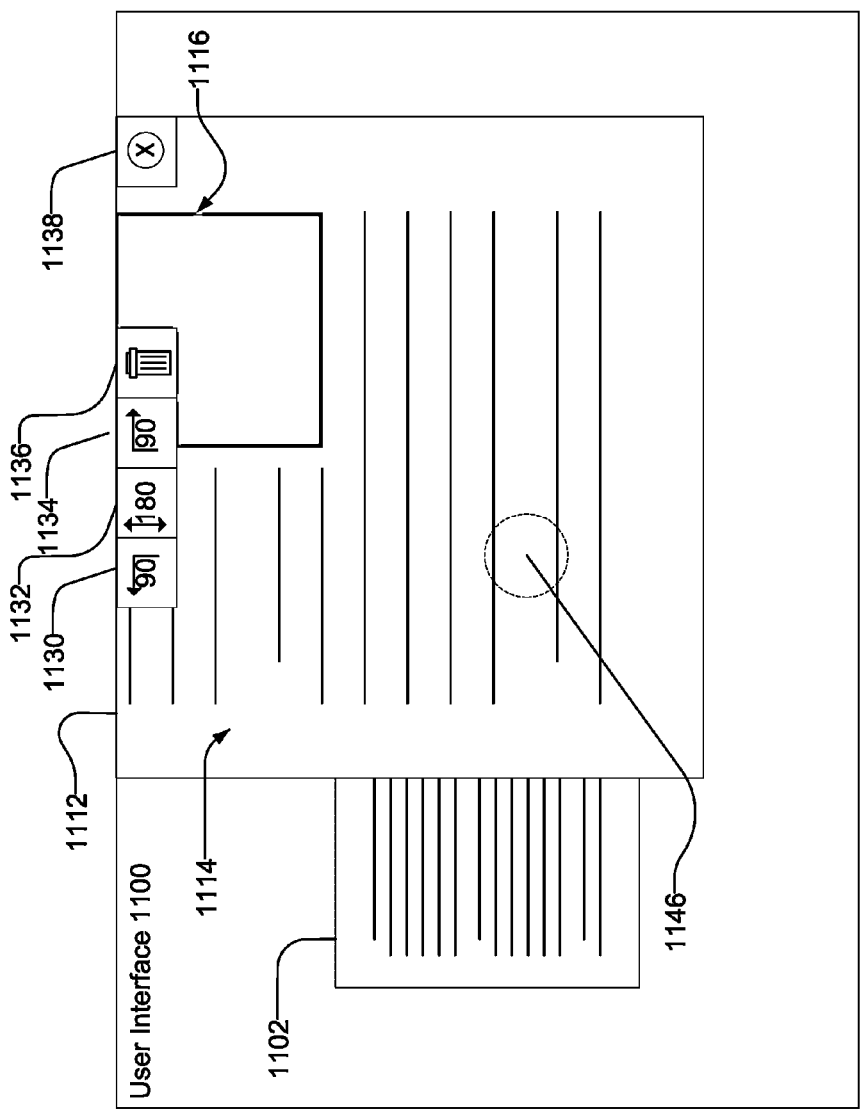
FIG. 11 is a user interface for page view de-zooming showing a zoom out of a double-touch and hold location

FIG. 11 shows a user interface for page view de-zooming showing a zoom out of a double-touch and hold location. Page 1112 is now de-zoomed slightly from page 1012 in FIG. 10 as a result of the double-touch and hold. Once the double-touch and hold is released, the interactive elements such as the rotate 90° left interface element 1130, a rotate 180° interface element 1132, a rotate 90° right interface element 1134, a delete interface element 1136 and a cancel interface element 1138 appear over the now-de-zoomed page 1112. More of the text 1114 and the image 1116 are now visible, but at a lower magnification level. In addition, the de-zoom has exposed page 1102, but not the third page visible in FIG. 5, because the de-zoom is centered on the touch 1146 on the left side of page 1112 which has caused the page 1112 to appear slightly to the right of center.

Description of Processes

Figure 12:
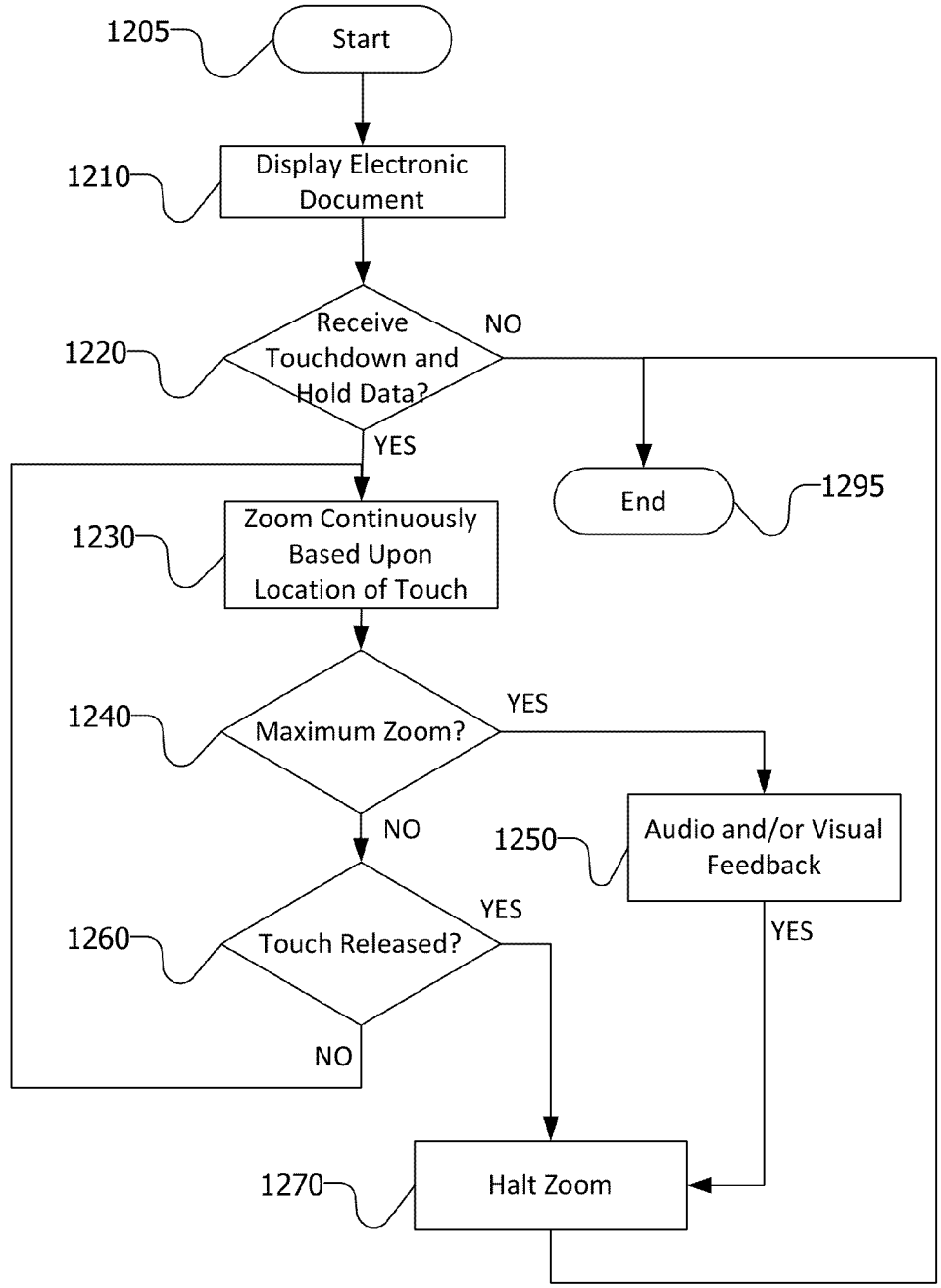
FIG. 12 is a flowchart for a user interface for page view zooming for a page.

Turning now to FIG. 12 there is shown a flowchart for a user interface for page view zooming of an image. First, an electronic document is displayed 1210. This electronic document may be made up of one or more pages as described above. An example of such a display appears in FIG. 5.

Next, the user interface subsystem 213 receives touchdown data and hold data 1220. The touchdown data and hold data, respectively, are generated by a touchscreen display showing a user interface, such as user interface 500, in response to user interactions with the touchscreen display by a user. The user touches the touchscreen display and then maintains the touch for a predetermined period of time, such as for example, one half second or one second.

The touchdown data is generated by the touchscreen display in response to perception of the user touch. The touchdown data includes a location on the touchscreen display that the touch takes place so that the controller 212 can identify over which user interface element the touch is made. The hold data includes an indication that a touch has been perceived and a length of time associated with that hold. If no touchdown data and hold data are received 1220, the process ends 1295.

When a touchdown data and hold data are received 1220, then the user interface subsystem 213 zooms the user interface on the touchscreen display continuously based upon the location of the touch 1230. This may be seen, for example, in FIGS. 7 and 8. The page over which the touch is received and the location on that page become the center of a zoom operation that begins to continuously increase the magnification of the page at a steady rate.

If the maximum level of zoom is attained 1240, then audio and/or visual feedback are provided via the touchscreen display 1250. There is a maximum level of zoom that is predetermined. This may be, for example, a 4× zoom or an 8× zoom. This may be limited based upon the amount of memory available for use by the touchscreen display, it may be limited based upon the touchscreen display characteristics (such as resolution of the display) or it may be limited for aesthetic reasons.

When this maximum is reached 1240, then the audio and/or visual feedback 1250 may be provided via the touchscreen display and the zoom is halted 1270. For example, a series of audible beeps may be provided or, alternatively, the screen may flash from a regular display to an inverted display to a regular display. Still further alternatively, the page that is being zoomed may incorporate a flashing outline. One or all of these audio and/or visual feedback, in addition to other types of audio and/or visual feedback, may occur 1250.

If the maximum zoom is not reached 1240, then a determination is made whether the touch has been released 1260. When the touchscreen display perceives that the touch has been released, it generates release data indicating as much to the user interface subsystem 213 which may be used by the processor 212 of the controller 210 to halt the zoom operation 1270.

When the release data is received, the zoom operation halts 1270 at the current level of magnification for the page. The release of the touch is preferable to other indications by the user because it will be the most readily perceived by a non-capacitive touchscreen. Other touchscreen technologies and mice provide more accurate ways to zoom, such as the pinch-to-zoom functionality or a series of clicks of a mouse to increase zoom levels. The touch, hold, and release functionality is effective and most readily ascertainable by a touchscreen display.

Once the touch is released 1260 and the zoom halted 1270, the process ends until another user interaction is initiated. If the touch is not released, the process returns to zoom continuously based upon the location of the touch 1230 and the process continues.

The flowchart of FIG. 12 has both a start 1205 and an end 1295, but the process is cyclical in nature and may relate to one or more simultaneous instances of page view de-zooming taking place in parallel or in serial. The flowchart in FIG. 12 read in conjunction with the associated description may serve as an algorithm for the operation of the CPU 212 in the controller 210 used in conjunction with the user interface subsystem 213 to thereby control the operation and display of a user interface on the user interface subsystem 213 and in response to user interaction.

Figure 13:
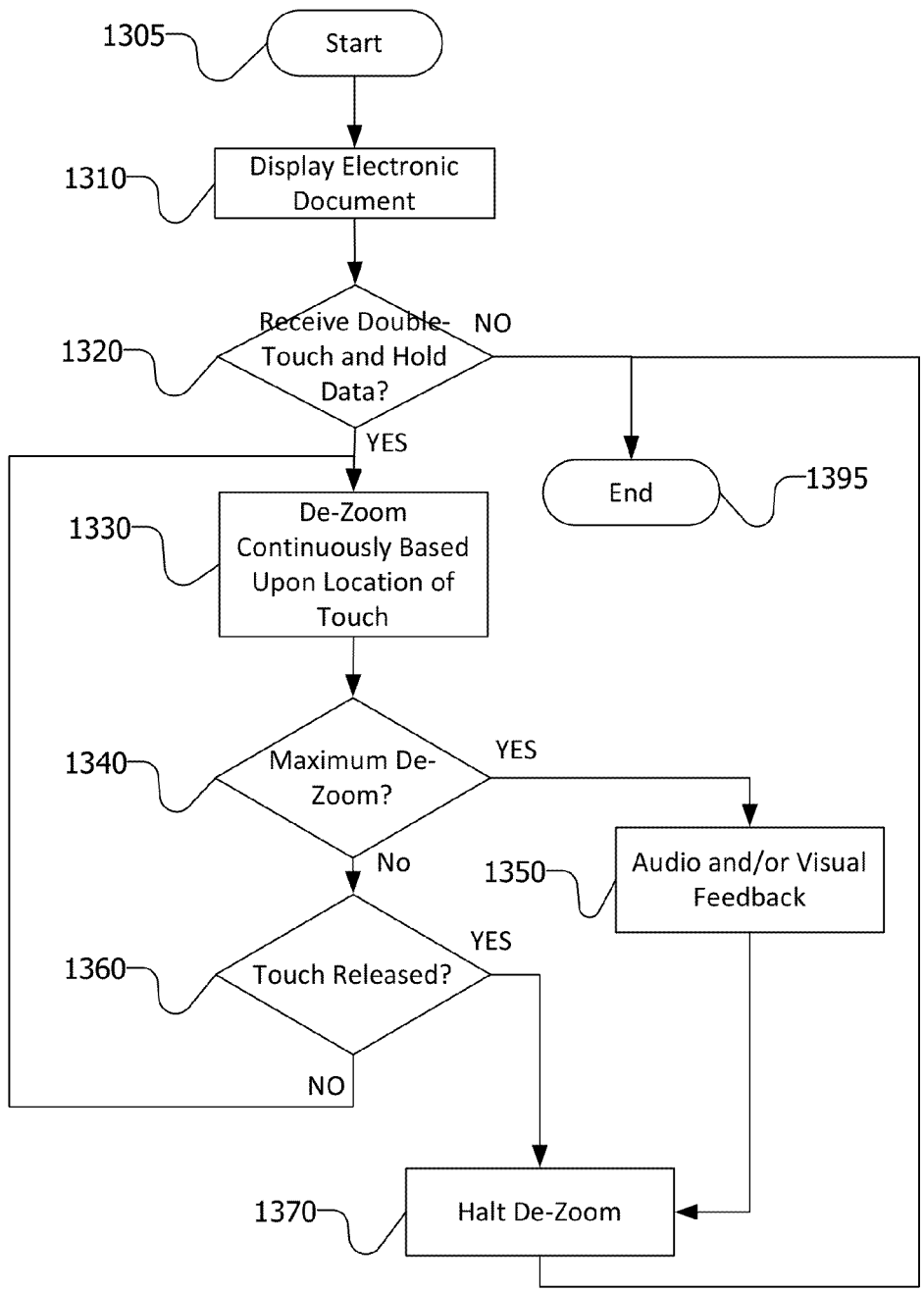
FIG. 13 is a flowchart for a user interface for page view de-zooming for a page.

FIG. 13 is a flowchart for a user interface for page view de-zooming of an image. The process begins at the display of an electronic document 1310 on a touchscreen display. This document may already have been magnified by the operation of the process described above with respect to FIG. 12. Next, a double-touch data and hold data are generated 1320 by the touchscreen display in response to two user touches on the screen in rapid succession and a non-removal of the second touch such that it is "held." The double-touch data and hold data are passed to a controller 210 for processing. If no double-touch data and hold data are received, the process ends 1395.

Next, the page over which the hold is centered is de-zoomed continuously based upon the location of the touch 1330. This may be seen, for example, in FIGS. 10 and 11. The de-zoom reduces the current level of magnification of the page centered on the location of the touch at a constant rate. If a minimum de-zoom is reached 1340, then audio and/or visual feedback are provided 1350 in a manner similar to that described above with respect to FIG. 12 and the de-zoom process is halted 1370. The maximum de-zoom may be a return to a 1× zoom from the originally displayed image or may enable a user to display an even smaller reduction in size on the touchscreen display.

If the maximum de-zoom is not reached 1340, then a determination whether the touch has been released 1360 is made. This determination is made when a touchscreen display associated with the user interface subsystem 213 perceives that a user has removed the touch from the touchscreen and, thereafter, generates release data. In response to this release data, the de-zoom is halted 1370 with the page appearing at the current magnification level. Thereafter, the process ends 1395. If the touch is not released 1360, then the process continues to de-zoom continuously based upon the location of the touch 1330 and the process proceeds from there.

The flowchart of FIG. 13 has both a start 1305 and an end 1395, but the process is cyclical in nature and may relate to one or more simultaneous instances of page view de-zooming taking place in parallel or in serial. The flowchart in FIG. 13 read in conjunction with the associated description may serve as an algorithm for the operation of the CPU 212 in the controller 210 used in conjunction with the user interface subsystem 213 to thereby control the operation and display of a user interface on the user interface subsystem 213 and in response to user interaction.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for providing a user interface of a multifunction peripheral comprising:
    generating a visual representation of an electronic document on the user interface on a touchscreen display of the multifunction peripheral, the electronic document shown in a default magnification level;
    receiving touchdown data indicating that a touch has been received from a user on the touchscreen display over the electronic document;
    receiving hold data indicating that the user has held the touch for a predetermined period of time over the electronic document;
    initiating a zoom operation by altering the visual representation in response to the touchdown data and the hold data;
    continuing the zoom operation such that a current magnification level of the electronic document is increased for the duration of the touch, the zoom operation centered on a portion of the electronic document over which the touch is positioned;
    receiving release data indicating that the user has released the touch;
    halting increase of the current magnification level in response to the release data; and
    displaying the visual representation showing a zoomed portion of the electronic document on the user interface, the zoomed portion being the visual representation of the portion of the electronic document over which the zoom operation was centered at the current magnification level.

2. The method of claim 1 further comprising:
    receiving double-touch data indicating that a second touch and a third touch have been received from the user within a second predetermined period of time; and
    returning the visual representation of the electronic document to the default magnification level in response to the double-touch data.

3. The method of claim 1 further comprising altering the visual representation of the zoomed electronic document to incorporate a plurality of interactive elements superimposed over the zoomed electronic document.

4. The method of claim 3 wherein the plurality of interactive elements include touch-sensitive user interface components that, when interacted with by a user, cause the zoomed electronic document to rotate relative to the user interface, cause the zoomed electronic document to return to the default magnification level, and cause the portion of the electronic document to be deleted.

5. The method of claim 1 further comprising:
receiving double-touch data indicating that a second touch and a third touch have been received from the user within a second predetermined period of time; and
receiving second hold data indicating that the user has held the third touch for a predetermined period of time over the electronic document;
initiating a de-zoom operation by altering the visual representation in response to the double-touch data and the second hold data;
continuing the de-zoom operation such that the current magnification level of the electronic document is decreased for the duration of the third touch, the de-zoom operation centered on a second portion of the electronic document over which the third touch is positioned;
receiving second release data indicating that the user has released the third touch;
halting decrease of the current magnification level in response to the second release data; and
regenerating the visual representation to show a de-zoomed portion of the electronic document on the user interface, the de-zoomed portion being the visual representation of the second portion of the electronic document at the current magnification level.

6. The method of claim 1 further comprising:
receiving maximum zoom data indicating that the current magnification level has reached a predetermined maximum;
halting increase of the current magnification level in response to the maximum zoom data; and
regenerating the visual representation to show a zoomed portion of the electronic document on the user interface, the zoomed portion being the visual representation of the portion of the electronic document at the current magnification level.

7. A multifunction peripheral, including a processor and associated memory, the multifunction peripheral including software that when executed by the processor causes the multifunction peripheral to:
generate a visual representation of an electronic document on a user interface on a touchscreen display of the multifunction peripheral, the electronic document shown in a default magnification level;
receive touchdown data indicating that a touch has been received from a user on the touchscreen display over the electronic document;
receive hold data indicating that the user has held the touch for a predetermined period of time over the electronic document;
initiate a zoom operation so as to alter the visual representation in response to the touchdown data and the hold data;
continue the zoom operation such that a current magnification level of the electronic document is increased for the duration of the touch, the zoom operation centered on a portion of the electronic document over which the touch is positioned;
receive release data indicating that the user has released the touch;
halt increase of the current magnification level in response to the release data; and
display the visual representation showing a zoomed portion of the electronic document on the user interface, the zoomed portion being the visual representation of the portion of the electronic document over which the zoom operation was centered at the current magnification level.

8. The multifunction peripheral of claim 7 wherein the software will further cause the multifunction peripheral to:
receive double-touch data indicating that a second touch and a third touch have been received from the user within a second predetermined period of time; and
return the visual representation of the electronic document to the default magnification level in response to the double-touch data.

9. The multifunction peripheral of claim 7 wherein the software will further cause the multifunction peripheral to alter the visual representation of the zoomed electronic document to incorporate a plurality of interactive elements superimposed over the zoomed electronic document.

10. The multifunction peripheral of claim 9 wherein the plurality of interactive elements include touch-sensitive user interface components that, when interacted with by a user, cause the zoomed electronic document to rotate relative to the user interface, cause the zoomed electronic document to return to the default magnification level, and cause the portion of the electronic document to be deleted.

11. The multifunction peripheral of claim 7 wherein the software will further cause the multifunction peripheral to:
receive double-touch data indicating that a second touch and a third touch have been received from the user within a second predetermined period of time; and
receive second hold data indicating that the user has held the third touch for a predetermined period of time over the electronic document;
initiate de-zoom operation so as to alter the visual representation in response to the double-touch data and the second hold data;
continue the de-zoom operation such that the current magnification level of the electronic document is decreased for the duration of the third touch, the de-zoom operation centered on a second portion of the electronic document over which the third touch is positioned;
receive second release data indicating that the user has released the third touch;
halt decrease of the current magnification level in response to the second release data; and
regenerate the visual representation to show a de-zoomed portion of the electronic document on the user interface, the de-zoomed portion being the visual representation of the second portion of the electronic document at the current magnification level.

12. The multifunction peripheral of claim 7 wherein the software will further cause the multifunction peripheral to:
receive maximum zoom data indicating that the current magnification level has reached a predetermined maximum;
halt increase of the current magnification level in response to the maximum zoom data; and
regenerate the visual representation to show a zoomed portion of the electronic document on the user interface, the zoomed portion being the visual representation of the portion of the electronic document at the current magnification level.

13. Apparatus comprising a storage medium storing a program having instructions which when executed by a processor will cause the processor to:
generate a visual representation of an electronic document on a user interface on a touchscreen display of a multifunction peripheral, the electronic document shown in a default magnification level;

receive touchdown data indicating that a touch has been received from a user on the touchscreen display over the electronic document;

receive hold data indicating that the user has held the touch for a predetermined period of time over the electronic document;

initiate a zoom operation so as to alter the visual representation in response to the touchdown data and the hold data;

continue the zoom operation such that a current magnification level of the electronic document is increased for the duration of the touch, the zoom operation centered on a portion of the electronic document over which the touch is positioned;

receive release data indicating that the user has released the touch;

halt increase of the current magnification level in response to the release data; and display the visual representation showing a zoomed portion of the electronic document on the user interface, the zoomed portion being the visual representation of the portion of the electronic document over which the zoom operation was centered at the current magnification level.

14. The apparatus of claim 13 wherein the software will further cause the processor to:

receive double-touch data indicating that a second touch and a third touch have been received from the user within a second predetermined period of time; and return the visual representation of the electronic document to the default magnification level in response to the double-touch data.

15. The apparatus of claim 13 wherein the software will further cause the processor to alter the visual representation of the zoomed electronic document to incorporate a plurality of interactive elements superimposed over the zoomed electronic document.

16. The apparatus of claim 15 wherein the plurality of interactive elements include touch-sensitive user interface components that, when interacted with by a user, cause the zoomed electronic document to rotate relative to the user interface, cause the zoomed electronic document to return to the default magnification level, and cause the portion of the electronic document to be deleted.

17. The apparatus of claim 13 wherein the software will further cause the processor to:

receive double-touch data indicating that a second touch and a third touch have been received from the user within a second predetermined period of time; and receive second hold data indicating that the user has held the third touch for a predetermined period of time over the electronic document;

initiate de-zoom operation so as to alter the visual representation in response to the double-touch data and the second hold data;

continue the de-zoom operation such that the current magnification level of the electronic document is decreased for the duration of the third touch, the de-zoom operation centered on a second portion of the electronic document over which the third touch is positioned;

receive second release data indicating that the user has released the third touch;

halt decrease of the current magnification level in response to the second release data; and regenerate the visual representation to show a de-zoomed portion of the electronic document on the user interface, the de-zoomed portion being the visual representation of the second portion of the electronic document at the current magnification level.

18. The apparatus of claim 13 wherein the software will further cause the processor to:

receive maximum zoom data indicating that the current magnification level has reached a predetermined maximum;

halt increase of the current magnification level in response to the maximum zoom data; and regenerate the visual representation to show a zoomed portion of the electronic document on the user interface, the zoomed portion being the visual representation of the portion of the electronic document at the current magnification level.

* * * * *